United States Patent
Ben-Haim et al.

(10) Patent No.: US 9,529,077 B2
(45) Date of Patent: Dec. 27, 2016

(54) POLLED TIME-OF-FLIGHT RESPONSE

(71) Applicant: INTEL CORPORATION, Santa Clara, CA (US)

(72) Inventors: Shani Ben-Haim, Haifa (IL); Yuval Amizur, Kfar-Saba (IL); Jonathan Segev, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/700,486

(22) Filed: Apr. 30, 2015

(65) Prior Publication Data

US 2015/0234034 A1    Aug. 20, 2015

Related U.S. Application Data

(63) Continuation of application No. 13/929,139, filed on Jun. 27, 2013, now Pat. No. 9,125,168.

(60) Provisional application No. 61/755,609, filed on Jan. 23, 2013.

(51) Int. Cl.
*G01S 5/10*     (2006.01)
*H04W 4/02*     (2009.01)
*H04L 7/00*     (2006.01)

(52) U.S. Cl.
CPC ............... *G01S 5/10* (2013.01); *H04L 7/0033* (2013.01); *H04W 4/02* (2013.01)

(58) Field of Classification Search
CPC ..... H04L 7/0033; H04W 4/02; H04W 56/004; H04W 56/0055; G01S 5/10; G01S 7/4865; G01S 7/4915; G01S 5/14
See application file for complete search history.

(56) References Cited

U.S. PATENT DOCUMENTS

| | | | |
|---|---|---|---|
| 5,510,800 | A | 4/1996 | McEwan |
| 5,717,406 | A | 2/1998 | Sanderford et al. |
| 6,006,097 | A | 12/1999 | Hornfeldt et al. |
| 6,310,576 | B1 | 10/2001 | Johnson |
| 6,317,386 | B1 | 11/2001 | Ward |
| 7,215,966 | B2 | 5/2007 | Joshi |

(Continued)

FOREIGN PATENT DOCUMENTS

| | | |
|---|---|---|
| CN | 101023632 | 8/2007 |
| KR | 20110012584 | 2/2011 |

(Continued)

OTHER PUBLICATIONS

International Preliminary Report on Patentability for PCT/US2014/012267, mailed Aug. 6, 2015, 10 pages.

(Continued)

*Primary Examiner* — Warner Wong
(74) *Attorney, Agent, or Firm* — Shichrur & Co.

(57) ABSTRACT

Embodiments of a communication station and method for time-of-flight (ToF) location determination in a wireless network are generally described herein. In some embodiments, a responding communication station receives a ToF measurement request. The responding communication station transmits an acknowledgment of the ToF measurement request. The responding communication station also transmits a response to the ToF measurement request that includes an indication of a time period for an initiating communication station to poll the responding communication station for a ToF result.

14 Claims, 3 Drawing Sheets

(56) References Cited

U.S. PATENT DOCUMENTS

| | | | |
|---|---|---|---|
| 7,433,322 B1 | 10/2008 | Alapuranen | |
| 8,600,420 B2* | 12/2013 | Lee | H04L 27/2655 370/330 |
| 8,918,117 B2* | 12/2014 | Rochberger | G01S 5/0236 455/456.1 |
| 9,008,126 B2 | 4/2015 | Dayanandan et al. | |
| 9,194,943 B2* | 11/2015 | Hassan | G01S 11/02 |
| 2002/0118723 A1 | 8/2002 | McCrady et al. | |
| 2004/0259571 A1 | 12/2004 | Joshi | |
| 2006/0209734 A1* | 9/2006 | Son | H04L 47/10 370/312 |
| 2007/0184864 A1 | 8/2007 | Leitch et al. | |
| 2010/0051459 A1 | 3/2010 | Li et al. | |
| 2010/0210214 A1* | 8/2010 | Pawar | H04W 72/082 455/63.1 |
| 2010/0283682 A1 | 11/2010 | Heidari-Bateni et al. | |
| 2011/0143778 A1 | 6/2011 | Hwang et al. | |
| 2011/0223905 A1* | 9/2011 | Lee | H04W 76/028 455/423 |
| 2011/0255523 A1* | 10/2011 | Barcel? Arroyo | H04W 4/02 370/338 |
| 2012/0269170 A1 | 10/2012 | Chen et al. | |
| 2012/0275329 A1 | 11/2012 | Chin et al. | |
| 2013/0051255 A1 | 2/2013 | Estevez et al. | |
| 2013/0329631 A1* | 12/2013 | Alam | H04W 52/362 370/328 |
| 2014/0078910 A1 | 3/2014 | Schatzberg et al. | |
| 2014/0127991 A1* | 5/2014 | Lim | H04W 76/023 455/39 |
| 2014/0187259 A1* | 7/2014 | Kakani | H04W 64/00 455/456.1 |
| 2014/0204793 A1 | 7/2014 | Ben-Haim et al. | |
| 2014/0269549 A1* | 9/2014 | Stephens | H04W 74/0891 370/329 |
| 2014/0301219 A1 | 10/2014 | Ben-Haim et al. | |
| 2014/0369225 A1 | 12/2014 | Burchard | |
| 2015/0219749 A1* | 8/2015 | Dua | G01S 13/878 455/456.1 |

FOREIGN PATENT DOCUMENTS

| | | |
|---|---|---|
| TW | 200422637 | 11/2004 |
| WO | 2011136705 | 11/2011 |
| WO | 2012/122607 | 9/2012 |
| WO | 2014116564 | 7/2014 |

OTHER PUBLICATIONS

International Search Report and Written Opinion for International Application No. PCT/US2014/012267, mailed on May 15, 2014, 11 pages.
Office Action for Taiwanese Patent Application No. 103102299, mailed on Feb. 10, 2015, 9 pages, including 1 page of English translation.
Office Action for U.S. Appl. No. 13/929,139, mailed Dec. 16, 2014, 12 pages.
Notice of Allowance for U.S. Appl. No. 13/929,139, mailed on Apr. 23, 2015, 11 pages.
Extended European Search Report for European Patent Application Serial No. 15180284.0, mailed on Feb. 5, 2016, 9 pages.
Search Report for European Patent Application No. 14743968.1 mailed on Sep. 15, 2016, 11 pages.

* cited by examiner

POLLED TIME-OF-FLIGHT RESPONSE

RELATED APPLICATION

This application claims the benefit of priority to U.S. Provisional Patent Application Ser. No. 61/755,609, filed Jan. 23, 2013, which is incorporated herein by reference in its entirety.

TECHNICAL FIELD

Embodiments pertain to wireless networks. Some embodiments relate to polled time-of-flight (ToF) response in a wireless communication network.

BACKGROUND

The IEEE 802.11 wireless standards define a frame exchange, between an initiator (e.g., mobile) and a responder (e.g., access point), from which time-of-flight (ToF) can be determined. The standards typically assume that the initiator is available to receive a response from the responder for the entire time after the initiator makes its request. However, the ToF calculations can take many milliseconds to accomplish. This can force the initiator to dwell on the requested channel until the response arrives, thus preventing the initiator from accomplishing any other tasks. For example, instead of being able to return to a serving channel (if not the same as the current ToF exchange channel), perform a power save function, and/or perform additional exchanges with the responder on a different channel, the initiator has to dwell on the ToF channel until a response is received.

The dwell problem can be worse when the initiator performs a trilateration for increased location accuracy. In such a scenario, the time the initiator dwells away from its serving channel can be multiplied by the number of dwell times encountered for each ToF calculation.

Thus there are general needs for improved ToF determination methods. There are also general needs for reducing initiator dwell time.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
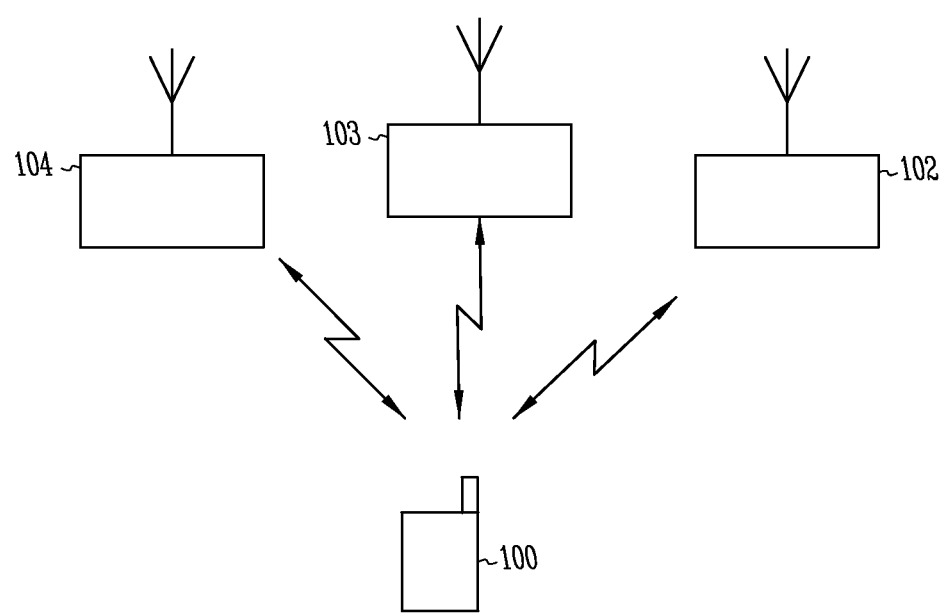
FIG. 1 illustrates various network elements of a wireless network in accordance with some embodiments.

FIG. 1 illustrates various network elements of a wireless communication network in accordance with some embodiments. The wireless communication network includes one or more wireless communication stations 100, 102-104 that may include a mobile wireless communicator (e.g., initiator) 100 and a plurality of access points (APs) (e.g., responders) 102-104 that may communicate over one or more wireless channels in accordance with IEEE 802.11 communication techniques.

The mobile wireless communicator 100 may be a mobile communication device that is non-stationary. Such a communication device may include mobile radiotelephones, tablet computers, lap top computers, and other communication devices that may communicate with the access points 102-104 over one or more wireless channels using a communication technique (e.g., IEEE 802.11).

The access points 102-104 may have fixed locations. The access points 102-104 may be part of a stationary network that may be coupled to a larger network. For example, the access points 102-104 may be part of a wired network that is coupled to the Internet. The mobile wireless communicator 100 may then access the larger network by communicating over the wireless communication channels with the access points.

It may be desirable for the mobile wireless communicator 100 to know its location with relation to the access points 102-104. Since the geographical locations of the access points 102-104 are fixed and known, the geographical location of the mobile wireless communicator 100 may be determined by trilateration and tracked thereafter. The trilateration may be accomplished by using ToF calculations.

The ToF calculations may be accomplished by one communication station (e.g., initiator, initiating communication station) sending a request to another communication station (e.g., responder, responding communication station) for a ToF response. The initiator may then use the ToF response to calculate a distance from the responder. If the initiator performs this ToF process with three or more responders, the initiator may determine its present position with relation to the responders. In one example, the mobile wireless communicator 100 of FIG. 1 may be an initiator while the access points 102-104 may be responders.

In order to avoid unnecessary dwell time and allow the initiator to perform another task such as returning to a serving channel, proceeding with a ToF exchange with other responders on different channels, or entering a power save mode, a ToF result poll request from the initiator may be utilized. The poll request may be sent by the initiator within a time period set by a minimum time and a maximum time, as defined by the responder and transmitted to the initiator. The ToF poll request may result in the responder sending a ToF calculation result of a previous time frame exchange to the initiator. Thus, the initiator may not have to dwell on the requested channel while waiting for a response from the responder. The initiator may simply poll the responder for the ToF calculation result during the time period reported by the responder.

Figure 2:
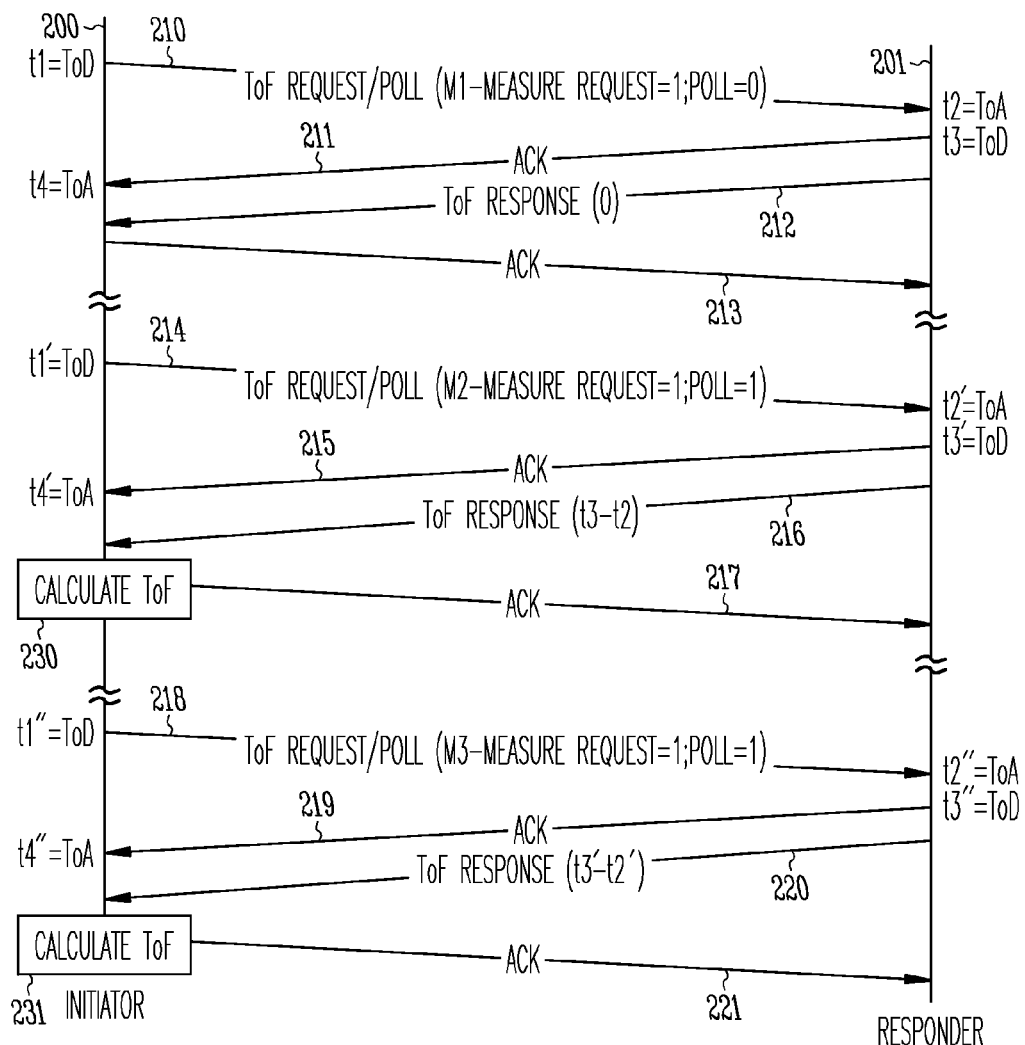
FIG. 2 illustrates a diagram of a procedure for a ToF frame exchange sequence in accordance with some embodiments.

FIG. 2 illustrates a diagram of a procedure for a ToF frame exchange sequence in accordance with some embodiments. An initiator 200 is shown on the left while a responder 201 is shown on the right. The diagram illustrates the various signaling performed when an initiator 200 desires to determine its location by polling a responder 201 for ToF information.

The initiator 200, wanting to determine a ToF measurement, sends a ToF measurement request/poll request action frame to the responder 201. In one embodiment, the measurement request/poll request action frame may contain both a ToF measurement initiation request bit and a poll request bit in addition to other data fields being transmitted to the responder. The measurement initiation and poll request bits may be in a first state (e.g., logical 1) to indicate a request for that respective information is being made or the bits may be in a second state (e.g., logical 0) to indicate that a request for that respective information is not being made.

Referring to FIG. 2, an initial ToF measurement request operation from the initiator 200 is started by an initial ToF measurement request/poll request action frame M1 210. The measurement initiation request bit may be set to the first state (e.g., logical 1) to indicate to the responder 201 that the initiator 200 is requesting that a ToF measurement be initiated. The poll request bit may be set to the second state (e.g., logical 0) since there are no previous measurement requests from which to determine ToF calculations. Thus, a poll request will not return any useful information.

In the illustrated embodiment, the time of departure (ToD) of the ToF measurement request 210 from the initiator 200 may be t1. This time may be noted by the initiator 200 for future ToF calculations. The time of arrival (ToA) of the ToF measurement request/poll request action frame 210 at the responder 201 may be t2.

The responder 201 may then transmit an acknowledgment response 211 (ACK) to the initiator 200 at ToD=t3 to indicate to the initiator 200 that the measurement request/poll action frame 210 was received. The times t2 and t3 may be noted by the responder 201 for future use in ToF calculations.

The initiator 200 received the acknowledgment response 211 at a ToA=t4. This time is noted by the initiator 200 for future ToF calculations.

The responder 201 transmits a ToF measurement response 212 to the initiator 200 in response to the ToF measurement request/poll request action frame M1 210. The ToF measurement response 212 may contain a "ToF result" field that may be empty (e.g., logical 0's). Since no ToF calculation was previously performed (i.e., this is the initial request), there are no ToF calculation results to report.

The ToF measurement response 212 may contain additional fields besides the "ToF result" field. For example, the ToF measurement response 212 may contain a "response calculation time" field that may indicate a minimum time period used by the responder 201 to perform any ToF result calculations. This time may be used by the initiator 200 as the minimum time to wait until polling for the presently initiated ToF results. The ToF measurement response 212 may also contain a "response buffer time" field that may indicate a maximum time period that the responder 201 may buffer the presently initiated ToF results prior to being polled by the initiator 200. This is the maximum time that the initiator 200 can wait prior to polling. After the "response buffer time" has expired, the presently initiated ToF calculation results may be removed from or overwritten in the responder's memory. The minimum time to wait until polling and the maximum time period that the responder 201 may buffer the ToF results may provide an indication of a time period that the initiator 200 can poll for the ToF results.

When the "response calculation time" and the "response buffer time" are the same, this may indicate an exact time during which the response is ready. Thus, the initiator 200 may poll the responder 201 at that exact time as indicated in both fields.

The ToF measurement response 212 may also contain a "request status" field. This field may indicate whether the ToF request for measurement can be accepted or deferred due to responder workload. For example, if the responder 201 is currently being queried by multiple initiators and cannot respond right away, the "request status" field may contain data that indicates that the request for ToF measurement initiation is being deferred. This field may also contain a time period for the deferred initiator to try the initiation request again.

In one embodiment, the initiator 200 may send an acknowledgment 213 to the responder 201 in response to receiving the ToF measurement response 212. An alternate embodiment may not include this acknowledgment 213.

In a second ToF measurement request operation, the initiator 200 sends a second ToF measurement request/poll action frame M2 214 to the responder 201. In the second ToF measurement request/poll action frame M2 214, the measurement request bit may be set to the first state (e.g., logical 1) to initiate another ToF operation and the poll request bit may be set to the first state (e.g., logical 1) to poll the responder 201 for the previous ToF calculation results.

The ToD from the initiator 200 for the second ToF measurement request/poll action frame 214 is t1' while the ToA at the responder 201 of this M2 frame 214 is t2'. The responder 201 transmits an acknowledgment 215 to the initiator 200 at time t3'. The acknowledgment 215 is received by the initiator 200 at time t4'.

The responder 201 also transmits the ToF measurement response 216 to the initiator 200. This response 216 contains the "ToF result" field that may indicate the time period of t3–t2. The t3–t2 time period is the "ToF result" field for the previous ToF measurement request. The t3–t2 time period may be used subsequently to determine ToF results.

The ToF measurement response 216 may also contain the "response calculation time" field indicating the minimum time for the responder 201 to perform the presently initiated ToF results. The ToF measurement response 216 may also contain the "response buffer time" field indicating the maximum time that the responder 201 may buffer the presently initiated ToF results prior to being deleted or overwritten.

The initiator 200 may perform the ToF calculations 230 after receipt of the ToF measurement response 216 with the "ToF result" field from the responder 201. In one embodiment, the ToF calculations 230 are performed by using the total round trip time as measured by the initiator 200 (e.g., t4–t1) and the processing time as measured by the responder 201 (e.g., t3–t2). The ToF may then be calculated by the net time that the initiating station is on the channel or ToF=(t4–t1)–(t3–t2). The distance between the initiator 200 and the responder 201 may then be determined by ToF/(2*speed_of_light). In one embodiment, the expression (t4–t1) is in the initiator clock domain and the expression (t3–t2) is in the responder clock domain.

The ToF calculations 230 also may remove multipath signal effects caused by signals that reflect off of other surfaces prior to reaching the initiator 200. Since the ToF calculations 230 may be used to determine a distance between the initiator 200 and the responder 201, the time between an originally transmitted signal and the originally received signal may be used since a reflected version of the originally transmitted signal may arrive at a later time, thus giving an incorrect time between transmission and reception of that particular signal. Since the reflected signals may have a weaker strength than the originally received signal, the ToF calculations 230 may attempt to remove these weaker signals from the ToF calculations 230 and use the strongest received signals.

In one embodiment, the initiator 200 may send an acknowledgment 217 to the responder 201 indicating that the ToF measurement response 216 was received. In an alternate embodiment, this acknowledgment 217 may not be sent.

A third ToF measurement request operation from the initiator 200 is started by the third ToF measurement request/poll action frame M3 218. In the M3 frame 218, the measurement request bit can be set to the first state (e.g., logical 1) and the poll request bit set to the first state (e.g., logical 1). This indicates to the responder 201 to initiate a ToF measurement operation and that a poll of the previous ToF calculation results (e.g., M2) is being requested.

The ToD from the initiator 200 for the ToF measurement request/poll action frame M3 218 is t1" while the ToA at the responder 201 of this M3 frame 218 is t2". The responder 201 transmits an acknowledgment 219 to the initiator 200 at time t3". The acknowledgment 219 is received by the initiator 200 at time t4".

The responder 201 also transmits the ToF measurement response 220 to the initiator 200. This response 220 may contain the "ToF result" field that may indicate the time period t3'−t2'. The t3'−t2' time period is the "ToF result" field for the previous ToF measurement request.

The ToF measurement response 220 may also contain the "response calculation time" field indicating the minimum time for the responder 201 to perform the presently initiated ToF results. The ToF measurement response 220 may also contain the "response buffer time" field indicating the maximum time that the responder 201 may buffer the presently initiated ToF results prior to being deleted or overwritten.

The initiator 200 may perform the ToF calculations 231 after receipt of the ToF measurement response 220 from the responder 201. In one embodiment, the ToF calculations 231 are performed by using the total round trip time as measured by the initiator 200 (e.g., t4'−t1') and the processing time as measured by the responder 201 (e.g., t3'−t2'). The ToF may then be calculated by the net time on the channel or ToF=(t4'−t1')−(t3'−t2'). The distance between the initiator 200 and the responder 201 may then be determined by ToF/(2*speed_of_light). In one embodiment, the expression (t4'−t1') is in the initiator clock domain and the expression (t3'−t2') is in the responder clock domain.

The ToF calculations 231 may also remove the multipath signal effects caused by signals that reflect off of other surfaces prior to reaching the initiator 200. As discussed previously, removing the multipath effects may increase the accuracy of the ToF calculations 231.

In one embodiment, the initiator 200 may send an acknowledgment 221 to the responder 201 indicating that the ToF measurement response 220 was received. In an alternate embodiment, this acknowledgment 221 may not be sent.

The embodiment of FIG. 2 illustrates a continuously operating ToF determination. This may be used in a situation where the initiator 200 is moving. In such a mobile scenario, the distance between the initiator 200 and the responders may be constantly changing and, thus, the ToF should be constantly updated to reflect the movement.

Figure 3:
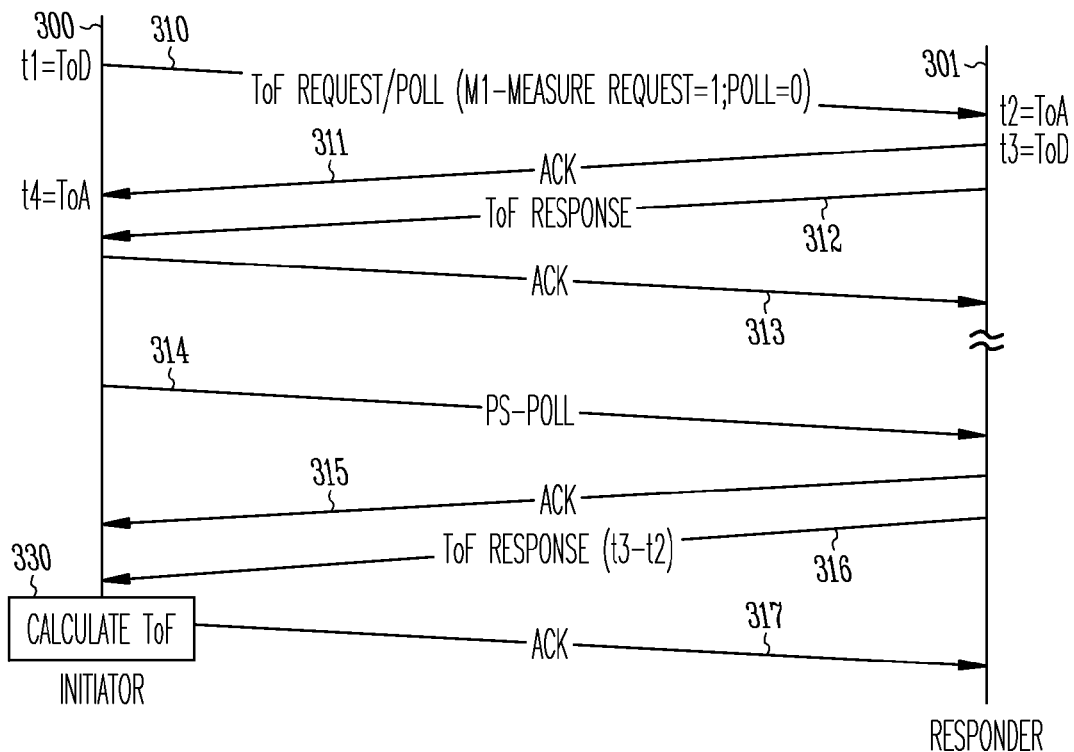
FIG. 3 illustrates a diagram of a procedure for a ToF frame exchange sequence in accordance with some other embodiments.

FIG. 3 illustrates a diagram of a procedure for a ToF frame exchange sequence in accordance with some other embodiments. The embodiment of FIG. 3 may be used when only a single ToF measurement is desired, such as when the initiator 300 is stationary.

An initial ToF measurement request operation from the initiator 300 is started by an initial ToF measurement request/poll action frame M1 310. The measurement initiation request bit may be set to the first state (e.g., logical 1) to indicate to the responder 301 that the initiator 300 is requesting that a ToF measurement be initiated. The poll request bit may be set to the second state (e.g., logical 0) since there are no previous measurement requests from which to determine ToF calculations. Thus, a poll request will not return any useful information.

In the illustrated embodiment, the time of departure (ToD) of the ToF measurement request/poll action frame M1 310 from the initiator 300 may be t1. This time may be noted by the initiator 300 for future ToF calculations. The time of arrival (ToA) of the M1 frame 310 at the responder 301 may be t2.

The responder 301 may then transmit an acknowledgment response 311 (ACK) to the initiator 300 at ToD=t3 to indicate to the initiator 300 that the M1 frame 310 was received. The times t2 and t3 may be noted by the responder 301 for future use in ToF calculations.

The initiator 300 received the acknowledgment response 311 at a ToA=t4. This time is noted by the initiator 300 for future ToF calculations.

The responder 301 transmits a ToF measurement response 312 to the initiator 300 in response to the initial ToF measurement request/poll action frame M1 310. The ToF measurement response 312 may contain a "ToF result" field that may be empty (e.g., logical 0's). Since no ToF calculation was previously performed (i.e., this is the initial and only request), there are no ToF calculation results to report.

The ToF measurement response 312 may contain additional fields besides the "ToF result" field. For example, the ToF measurement response 312 may contain a "response calculation time" field that may indicate a minimum time period used by the responder 301 to perform any ToF result calculations. This time may be used by the initiator 300 to know what is the minimum time to wait until polling for the presently initiated ToF calculation results. The ToF measurement response 312 may also contain a "response buffer time" field that may indicate a maximum time period that the responder 301 may buffer the presently initiated ToF results prior to being polled by the initiator 300. This is the maximum time that the initiator 300 can wait prior to polling. After the "response buffer time" has expired, the presently initiated ToF result calculations may be removed from or overwritten in the responder's memory.

When the "response calculation time" and the "response buffer time" are the same, this may indicate an exact time during which the response is ready. Thus, the initiator 300 may poll the responder 301 at that exact time as indicated in both fields.

The ToF measurement response 312 may also contain a "request status" field. This field may indicate whether the ToF request for measurement can be accepted or deferred due to responder workload. For example, if the responder 301 is currently being queried by multiple initiators and cannot respond right away, the "request status" field may contain data that indicates that the request for ToF measurement initiation is being deferred. This field may also contain a time period for the deferred initiator to try the initiation request again.

In one embodiment, the initiator 300 may send an acknowledgment 313 to the responder 301 in response to receiving the ToF measurement response 312. An alternate embodiment may not include this acknowledgment 313.

The initiator 300 then sends a poll request message 314. Since this is the only ToF calculation result that is desired, the ToF measurement request bit is not used in this poll request message 314.

The responder 301 acknowledges 315 receipt of the poll request message 314 and responds with a ToF measurement response 316 (e.g., calculation results). The "ToF result" field may contain the t3–t2 time. In one embodiment, the initiator 300 may send acknowledgment 317 of the receipt of the ToF measurement response 316. In an alternate embodiment, the initiator 300 may not send this acknowledgment 317.

The initiator 300 may perform the ToF calculations 330 after receipt of the ToF measurement response 316 from the responder 301. In one embodiment, the ToF calculations 330 are performed by using the total round trip time as measured by the initiator 300 (e.g., t4–t1) and the processing time as measured by the responder 301 (e.g., t3–t2). The ToF may then be calculated by the net time on the channel or ToF=(t4–t1)–(t3–t2). The distance between the initiator 300 and the responder 301 may then be determined by ToF/(2*speed_of_light). In one embodiment, the expression (t4–t1) is in the initiator clock domain and the expression (t3–t2) is in the responder clock domain.

The ToF calculations 330 may also remove multipath signal effects caused by signals that reflect off of other surfaces prior to reaching the initiator 300. As discussed previously, removing the multipath effects may increase the accuracy of the ToF calculations 330.

While the above-described embodiments have shown the initiator 300 performing the calculations for the ToF and resulting distance between the initiator 300 and the responder 310, there is no limitation as which communication station performs the ToF calculations. An alternate embodiment may have the responder perform these calculations.

Figure 4:
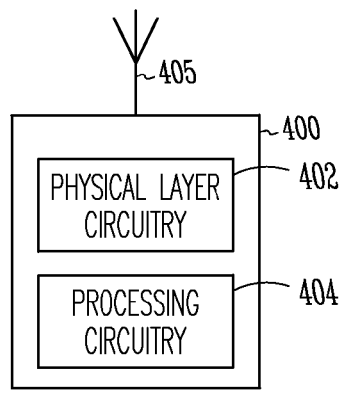
FIG. 4 illustrates a functional diagram of a wireless communication station in accordance with some embodiments.

FIG. 4 is a functional diagram of a communication station in accordance with some embodiments. Communication station 400 may be suitable for use as a mobile wireless communicator 100 (FIG. 1) or any of the access points 102-104 (FIG. 1), although other configurations may also be suitable.

Communication station 400 may include physical layer circuitry 402 to communicate wirelessly with access points, mobile communication devices, and other communication stations over an antenna 405. Communication station 400 may also include processing circuitry 404 coupled to the physical layer circuitry 402 to perform other operations described herein.

In accordance with embodiments, the physical layer circuitry 402 may be configured to transmit and receive ToF messages between communication stations. The physical layer circuitry 402 may also be configured to transmit and receive acknowledgments as well as other communications between communication stations.

In accordance with embodiments, the processing circuitry 404 may be configured to calculate ToF measurements. The processing circuitry 404 may also be configured to calculate time intervals as specified for polling other communication stations.

Although communication station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of communication station 400 may refer to one or more processes operating on one or more processing elements.

In some embodiments, communication station 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, a communication station may include one or more of a keyboard, a display, a non-volatile memory port, multiple antennas, a graphics processor, an application processor, speakers, and other mobile device elements. The display may be an LCD or LED screen, including a touch screen.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

EXAMPLES

Example 1 is a method performed by a communication station for time-of-flight (ToF) calculation that comprises: receiving, from an initiating communication station, a ToF measurement request at a first time, transmitting, to the initiating communication station, an acknowledgment of the ToF measurement request at a second time, and transmitting, to the initiating communication station, a response to the ToF measurement request comprising an indication of a time period for the initiating communication station to poll a responding communication station for a ToF result.

In Example 2, the subject matter of Example 1 can optionally include receiving, from the initiator, a polling request, and transmitting the ToF result to the initiating communication station.

In Example 3, the subject matter of Example 1 can optionally include determining a difference between the first time and the second time as the ToF result.

In Example 4, the subject matter of Example 1 can optionally include transmitting, to the initiating communication station, a time for the initiating communication station to wait prior to polling the responding communication station; and transmitting, to the initiating communication station, a time that the responding communication station buffers the ToF result.

In Example 5, the subject matter of Example 1 can optionally include the first time is t2 and the second time is t3, the method further comprises: the initiating communication station transmitting the ToF measurement request at a time t1; the initiating communication station receiving the acknowledgment of the ToF measurement request at a time t4; and calculating ToF between the initiating communication station and the responding communication station in response to (t4−t1)−(t3−t2).

In Example 6, the subject matter of Example 5 can optionally include calculating a distance between the initiating communication station and the responding communication station in response to ToF/(2*speed_of_light).

In Example 7, the subject matter of Example 5 can optionally include the initiating communication station removing multipath signal effects from received signals.

In Example 8, the subject matter of Example 1 can optionally include receiving, from the initiating communication station an acknowledgment of the response to the ToF measurement request.

In Example 9, the subject matter of Example 1 can optionally include the initiating communication station being a mobile wireless communicator.

In Example 10, the subject matter of Example 1 can optionally include the initiating communication station being an access point.

Example 11 is a wireless communication station to operate as an initiating communication station for time-of-flight (ToF) determination. The initiating communication station configured to: transmit, to a responding communication station, a second ToF request subsequent to a first ToF request, the first ToF request comprising a first measurement request and the second ToF request comprising a second measurement request and a polling request; receive, from the responding communication station, an acknowledgment of the second ToF request; and receive, from the responding communication station and in response to the polling request, a ToF result comprising a time difference between a time that the responding communication station received the first ToF request and a time that the responding communication station transmitted an acknowledgment to the first ToF request, the ToF result further comprising an indication of a time period for the initiating communication station to poll the responding station for a ToF result resulting from the second ToF request.

In Example 12, the subject matter of Example 11 can optionally include the initiating communication station being part of a wireless communication network that further comprises the responding communication station, the responding communication station configured to: receive, from the initiating communication station, the second ToF request subsequent to the first ToF request; transmit, to the initiating communication station, the acknowledgment of the second ToF request; and transmit, to the initiating communication station, the ToF result.

In Example 13, the subject matter of Example 12 can optionally include the wireless communication network further comprising a plurality of responding communication stations.

In Example 14, the subject matter of Example 13 can optionally include the initiating communication station being further configured to determine a ToF with each of the plurality of responding communication stations in response to a respective indication of a time period for the initiating communication station to poll the respective responding communication station.

Example 15 is a wireless communication station configured to operate as a mobile communication device for time-of-flight (ToF) determination. The device comprises: an antenna; physical layer circuitry coupled to the antenna and configured to transmit a plurality of ToF requests to an access point, a first ToF request comprising a measurement request and subsequent ToF requests comprising the measurement request and a poll request, each of the plurality of ToF requests transmitted at an associated time; and processing circuitry configured to perform ToF calculations in response to a ToF frame exchange sequence, wherein, during the ToF frame exchange sequence: the physical layer circuitry is configured to receive an acknowledgment associated with each ToF request and a ToF result comprising a first time difference that is a difference between a time the access point received the ToF request and the associated acknowledgment is transmitted, the ToF result further comprising a time period during which the mobile communication device can poll the access point for the ToF result, and the processing circuitry is configured to determine a second time difference that is a difference between the associated time a particular ToF request is transmitted and a time of receipt of an associated acknowledgment, the processing circuitry is further configured to determine a location of the mobile communication station in relation to the access point in response to a different between the first time difference and the second time difference.

In Example 16, the subject matter of Example 15 can optionally include the processing circuitry being further configured to remove multipath signal effects from received signals.

Example 17 is a non-transitory computer-readable storage medium that stores instructions for execution by processing circuitry of a mobile wireless communication station to perform operations to determine a location with respect to a stationary wireless communication station using time-of-flight (ToF) results. The operations to configure the mobile wireless communication station to: transmit a ToF measurement request; receive an acknowledgment of the ToF measurement request; receive a ToF response comprising an indication of a time period to poll the stationary wireless communication station for a ToF result; and poll the stationary wireless communication station for the ToF result during the time period.

In Example 18, the subject matter of Example 17 can optionally include the operations further configure the stationary wireless communication station to: receive the ToF measurement request; receive a poll request; transmit the acknowledgment of the ToF measurement request and the poll request; and transmit the ToF result in response to the poll request, the ToF result comprising an indication of a time period for the mobile wireless communication station to transmit the poll request.

Example 19 is a wireless communication station to operate as a mobile communication device for time-of-flight (ToF) determination. The wireless communication station comprises means for receiving, from an initiating communication station, a ToF measurement request/poll action frame, comprising a measurement request bit indicating to perform a measurement, at a first time, means for transmitting, to the initiating communication station, an acknowledgment of the ToF measurement request/poll action frame at a second time, and means for transmitting, to the initiating communication station, a response to the ToF measurement request/poll action frame, the response comprising a request to perform the measurement and an indication of a time period for the initiating communication station to poll a responding communication station for a ToF result.

In Example 20, the subject matter of Example 19 can optionally include the means for receiving comprising physical layer circuitry.

In Example 21, the subject matter of Example 19 can optionally include the means for transmitting comprising physical layer circuitry.

Example 22 is a method performed by a communication station for time-of-flight (ToF) calculation. The method comprises transmitting, to a responding communication station, a ToF measurement request, receiving, from the responding communication station, an acknowledgment of the ToF measurement request, receiving, from the responding communication station, a ToF response comprising an indication of a time period for an initiating communication station to poll the responding station for a ToF result, and polling the responding communication station for the ToF result during the time period.

In Example 23, the subject matter of Example 22 can optionally include the ToF measurement requesting a second measurement request and a previous ToF result comprising the ToF result from a first measurement request occurring prior to the second measurement request.

In Example 24, the subject matter of Example 22 can optionally include receiving the ToF result from the responding communication station, and determining a distance between the initiating communication station and the responding communication station in response to a net time that the initiating communication station is on a communication channel with the responding communication station.

In Example 25, the subject matter of Example 22 optionally include receiving a previous ToF result from the responding communication station, wherein the ToF result comprises a first difference that is a difference between a time that the responding communication station received the ToF request and a time that the responding communication station transmitted the acknowledgment of the ToF request, determining a second difference that is a difference between a time that the initiating communication station transmitted the ToF request and a time that the initiating communication station received the acknowledgment, and determining the ToF in response to a difference between the first difference and the second difference.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus including circuitry to cause an initiating station to:
   transmit a time of flight (ToF) measurement request to a responding station, the ToF measurement request comprising a measurement request bit indicating a request to perform a ToF measurement;
   receive an acknowledgment (ACK) from the responding station;
   receive a response after reception of the ACK, the response including a status field to indicate if the request to perform the ToF measurement is accepted or not accepted;
   receive ToF measurements from the responding station, the ToF measurements in a time of arrival (ToA) field and a time of departure (ToD) field; and
   trigger a calculation for a determination of a location of the initiating station based on the ToF measurements.

2. The apparatus of claim 1, wherein the circuitry is to cause the initiating station to:
   process a ToF measurement from the responding station, the ToF measurement including a first time of departure (ToD) measurement, denoted t3, and a first time of arrival (ToA) measurement, denoted t2; and
   capture at the initiating station a second ToD, denoted t1, and a second ToA, denoted t4.

3. The apparatus of claim 2, wherein the circuitry is to cause the initiating station to process a round trip time, which is based on a calculation of $(t4-t1)-(t3-t2)$.

4. The apparatus of claim 1 comprising a mobile wireless communicator.

5. The apparatus of claim 1 comprising a mobile wireless communicator having a touch screen display.

6. An apparatus including circuitry to cause a responding station to:
   receive a time of flight (ToF) measurement request from an initiating station, the ToF measurement request comprising a measurement request bit indicating a request to perform a ToF measurement;
   transmit an acknowledgment to the initiating station;
   transmit a response after transmission of the acknowledgment, the response including a status field to indicate if the request to perform the ToF measurement is accepted or not accepted; and
   transmit a ToF measurement including a time of departure (ToD) measurement, and a time of arrival (ToA) measurement, the ToA measurement comprising a measurement of a time of arrival of an acknowledgment from the initiating station.

7. The apparatus of claim 6, wherein the circuitry is to cause the responding station to:
   transmit to the initiating station ToF measurements in a time of arrival (ToA) field and a time of departure (ToD) field.

8. The apparatus of claim 6 comprising an access point.

9. The apparatus of claim 6 comprising one or more antennas.

10. A non-transitory computer-readable storage medium that stores instructions for execution by processing circuitry of a responding station to perform operations to configure the responding station to:
    process a time of flight (ToF) measurement request received from an initiating station, the ToF measurement request comprising a measurement request bit indicating a request to perform a ToF measurement;
    transmit, to the initiating station, an acknowledgment (ACK);
    transmit a response after transmission of the ACK, the response including a status field to indicate if the request to perform the ToF measurement is accepted or not accepted; and
    transmit a ToF measurement including a time of departure (ToD) measurement and a time of arrival (ToA) measurement, the ToA measurement comprising a measurement of a time of arrival of an ACK from the initiating station.

11. The non-transitory computer-readable storage medium of claim 10, wherein the instructions, when executed, are to cause the responding station to:
    transmit ToF measurements to the initiating station, the ToF measurements being in a time of arrival (ToA) field and time of departure (ToD) field.

12. A non-transitory computer-readable storage medium that stores instructions for execution by processing circuitry of an initiating station to perform operations to cause the initiating station to:
    transmit, to a responding station, a time of flight (ToF) measurement request, the ToF measurement request comprising a measurement request bit indicating a request to perform a ToF measurement;

receive, from the responding station, an acknowledgement (ACK);

receive a response after reception of the ACK, the response including a status field to indicate if the request to perform the ToF measurement is accepted or not accepted;

receive from the responding station ToF measurements in a time of arrival (ToA) field and a time of departure (ToD) field; and trigger a calculation for a determination of a location of the initiating station based on the ToF measurements.

13. The non-transitory computer-readable storage medium of claim 12, wherein the instructions, when executed, are to cause the initiating station to:

process a ToF measurement frame received from the responding station, the ToF measurement frame including a first time of departure (ToD) measurement, denoted t3, and a first time of arrival (ToA) measurement, denoted t2; and capture at the initiating station a second ToD, denoted t1, and a second ToA, denoted t4.

14. The non-transitory computer-readable storage medium of claim 13, wherein the instructions, when executed, are to cause the initiating station to process a round trip time, which is based on a calculation of (t4−t1)−(t3−t2).

* * * * *